Jan. 13, 1970      F. VAN WINSEN ET AL     3,489,237
       DRIVE UNIT FOR VEHICLES, ESPECIALLY MOTOR
               VEHICLES WITH FRONT AXLE DRIVE
Filed June 15, 1967                        2 Sheets-Sheet 1

INVENTORS
FRIEDRICH VanWINSEN
ERWIN LÖFFLER

BY  Dicke & Craig
                    ATTORNEYS

Jan. 13, 1970  F. VAN WINSEN ET AL  3,489,237
DRIVE UNIT FOR VEHICLES, ESPECIALLY MOTOR
VEHICLES WITH FRONT AXLE DRIVE
Filed June 15, 1967  2 Sheets-Sheet 2

INVENTORS
FRIEDRICH Van WINSEN
ERWIN LÖFFLER

Dike & Craig ATTORNEYS

United States Patent Office 3,489,237
Patented Jan. 13, 1970

3,489,237
DRIVE UNIT FOR VEHICLES, ESPECIALLY MOTOR VEHICLES WITH FRONT AXLE DRIVE
Friedrich van Winsen, Kirchheim, Teck, and Erwin Loffler, Fellbach, Wurttemberg, Germany, assignors to Daimler-Benz Aktiengesellschaft, Stuttgart-Unterturkheim, Germany
Filed June 15, 1967, Ser. No. 646,404
Claims priority, application Germany, June 18, 1966,
D 50,345
Int. Cl. B60k 9/00
U.S. Cl. 180—55                           7 Claims

ABSTRACT OF THE DISCLOSURE

A drive unit for vehicles, especially a drive unit for front-wheel drive motor vehicles in which the engine, transmission, and differential gear are combined into a unit, whereby the engine is arranged substantially in the vehicle longitudinal direction, the transmission is disposed alongside the rear portion of the engine, and a hydrodynamic unit or clutch is flanged to the forward end of the engine block whose input member is driven by the forward end of the crankshaft while its output member drives the transmission input shaft by way of a countershaft reduction gear or chain drive; the transmission input shaft extends past the housing of the differential gear substantially parallel to the crankshaft while the transmission output shaft leads forwardly from the transmission to the differential gear which is arranged forwardly of the transmission. The arrangement may be made in such a manner that the transmission input shaft extends through the drive bevel pinion of the differential gear and through the hollow transmission output shaft connected with the latter. The differential gear is arranged generally on the side of the engine block while the engine itself may be displaced with respect to the vehicle longitudinal center plane to the side opposite the side of the vehicle on which the transmission and differential gear are located.

BACKGROUND OF THE INVENTION

The present invention relates to a drive unit for vehicles, especially for motor vehicles with front-wheel drive whereby the engine, clutch, transmission and differential gear are combined into a block and are arranged at the front axle.

Front-wheel drive units of the aforementioned type are known, per se, both for engines which are disposed longitudinally as well as transversely to the vehicle. With the latter, the transmission is located practically below the engine so that the hood cannot be made sufficiently low, i.e. the upper contours of the hood must be maintained relatively high. With the former types of construction, the engine is disposed either in front or to the rear of the axle which has as a consequence either an unfavorable load distribution or lack of space at the front seats. This is so as with such types of units one is not only concerned to construct the same as compact as possible but rather one also has to be able to arrange the same with a favorable axle load distribution within the available space.

SUMMARY OF THE INVENTION

The present invention solves the underlying problems with the aforementioned type drive units in that the engine is disposed in the vehicle longitudinal direction above the front axle and in that a hydrodynamic unit or a mechanical clutch is arranged at its crankshaft end which drives, by way of a countershaft or reduction gear, the transmission input shaft which, in turn, extends adjacent the crankshaft and essentially parallel thereto past the housing of the differential gear, to the transmission arranged adjacent the engine whose output shaft leads forwardly to the differential gear. A very compact drive block results from such an arrangement which—though disposed above the axle—enables a low engine hood and a favorable axle load distribution.

It is thereby possible to extend the transmission input shaft past the transmission and to drive the same at the rear end by means of a further countershaft gear. This is appropriate if existing transmission units are to be taken over. The present invention prefers a solution according to which the transmission input shaft extends through the hollow transmission output shaft and the hollow bevel pinion of the differential gear. This entails the advantage that one is able to selectively utilize either manually shifted or automatic transmissions. Furthermore, the present invention prefers if the pinion countershaft gear is arranged between the engine and the hydrodynamic unit and the driven wheel of the unit is connected with the countershaft gear wheel by means of a hollow shaft. Either a hydrodynamic torque converter or a hydrodynamic coupling may be provided in that case. Of course, in lieu of the gear-wheel countershaft or reduction gear, also a chain or any other connection operable in an analogous manner may be used. The chain avoids in an advantageous manner any gear noises.

In order that the transmission may be well and readily accommodated, it is appropriate if, according to the present invention, the housing of the differential gear is disposed between the crankshaft, i.e. between the engine and the transmission input shaft. Furthermore, one of the output or driven shafts of the differential gear may extend through the engine housing below the crankshaft. The other driven or output shaft of the differential gear is then located below the transmission input shaft. By the use of such an arrangement, the structural height becomes particularly small if, according to the present invention, the one driven or output shaft of the differential gear extends below a main bearing of the crankshaft.

If with these arrangements, the engine is disposed in the longitudinal center plane of the vehicle, the driving half-axle shafts and the bending angles of the joints are naturally different on the two sides. In order to counteract the same, the engine may be displaced according to the present invention toward the side opposite the transmission.

It is also within the scope of the present invention if the entire block is assembled in a unitary housing. Of course, this may also take place only in part, for example, with the gear wheel countershaft transmissions and/or with the hydrodynamic torque converter whereby the other partial units are flangedly connected one to the other, i.e. primarily at the engine block.

Accordingly, it is an object of the present invention to provide a drive unit for vehicles, especially for motor vehicles with front wheel drive which is simple in construction and reliable in operation and which effectively eliminates the aforementioned shortcomings and drawbacks encountered with the prior art constructions.

Another object of the present invention resides in a drive unit for vehicles, especially motor vehicles with front wheel drive, which is so constructed and arranged as to permit a relatively low engine hood design.

A further object of the present invention resides in a drive unit for motor vehicles with front-wheel drive which brings about a favorable load distribution without reducing the available space at the front seats of the vehicle.

A still further object of the present invention resides in a drive unit for vehicles of the type described above which is extraordinarily compact, permits a favorable axle load distribution and minimizes the space requirements therefor.

Another object of the present invention resides in a drive unit for vehicles, especially for motor vehicles with front-wheel drive which permits not only the use of existing transmissions but also can be used selectively with either manual or automatic transmissions.

These and further objects, features and advantages of the present invention will become more obvious from the following description, when taken in connection with the accompanying drawing which shows, for purposes of illustration only, one embodiment in accordance with the present invention and wherein.

Figure 1:
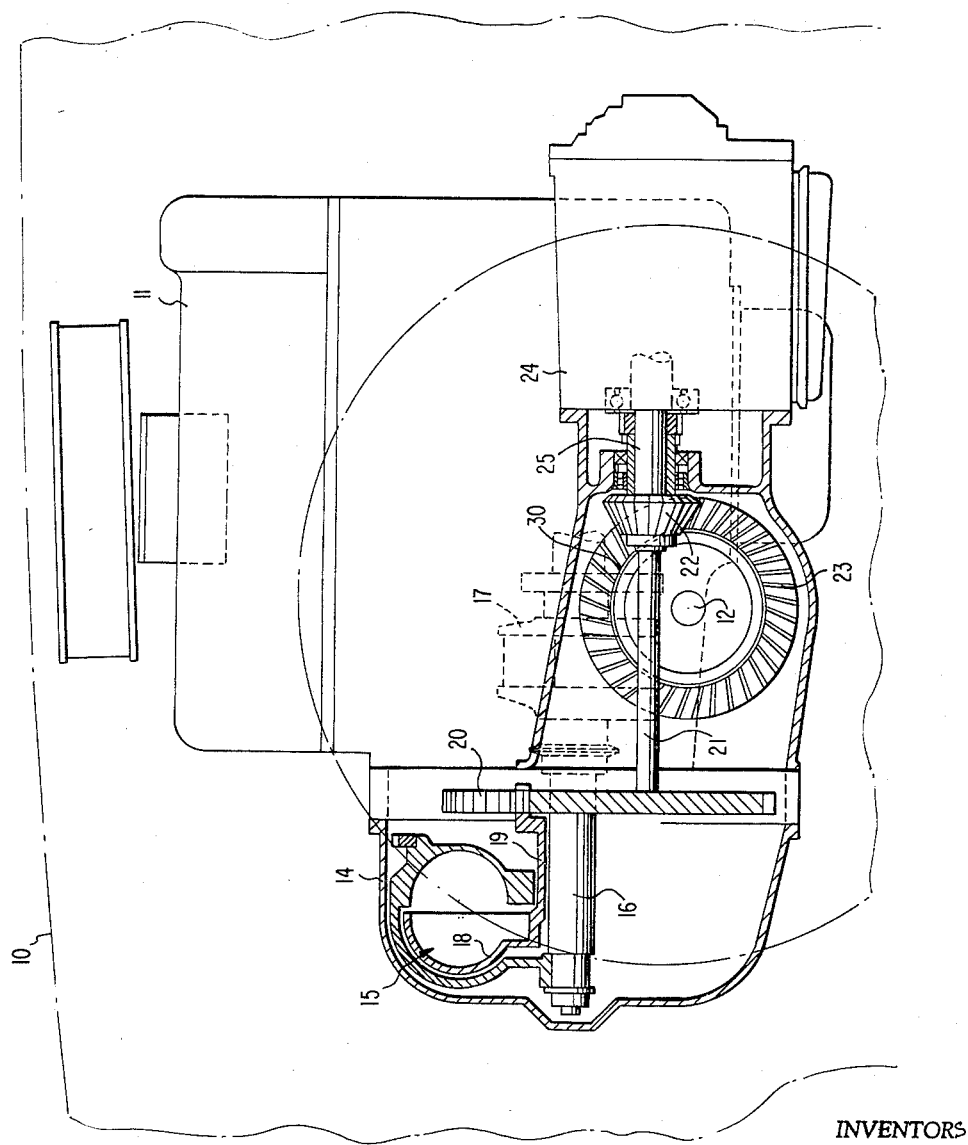
FIGURE 1 is a side elevational view of a front-wheel drive unit in accordance with the present invention with some parts shown in cross section for the sake of clarity.

Referring now to the drawing wherein like reference numerals are used throughout the various views to designate like parts, there is disposed below the engine hood 10, only indicated schematically in the drawing, the engine block 11 of a motor vehicle (not shown in detail) which may be of any conventional construction. The engine block 11 is disposed in the vehicle longitudinal direction, and the engine thereof is constructed in this case as V-type engine, though any other engine may, of course, be used. The engine is disposed essentially over the front wheel axle 12 and is secured at the longitudinal bearer members 13 (FIGURE 2) of the vehicle in any conventional manner not illustrated herein.

A housing 14 is flangedly connected to the forward end of the engine block 11 (FIGURE 1), within which is accommodated a conventional hydrodynamic torque converter generally designated by reference numeral 15 and not illustrated in detail herein. Its pump wheel is driven from the forwardly extended end 16 of the crankshaft 17. The turbine wheel 18 drives by means of a hollow shaft 19 a gear-wheel countershaft transmission 20 which is supported on the end 16 of the crankshaft 17.

Figure 2:
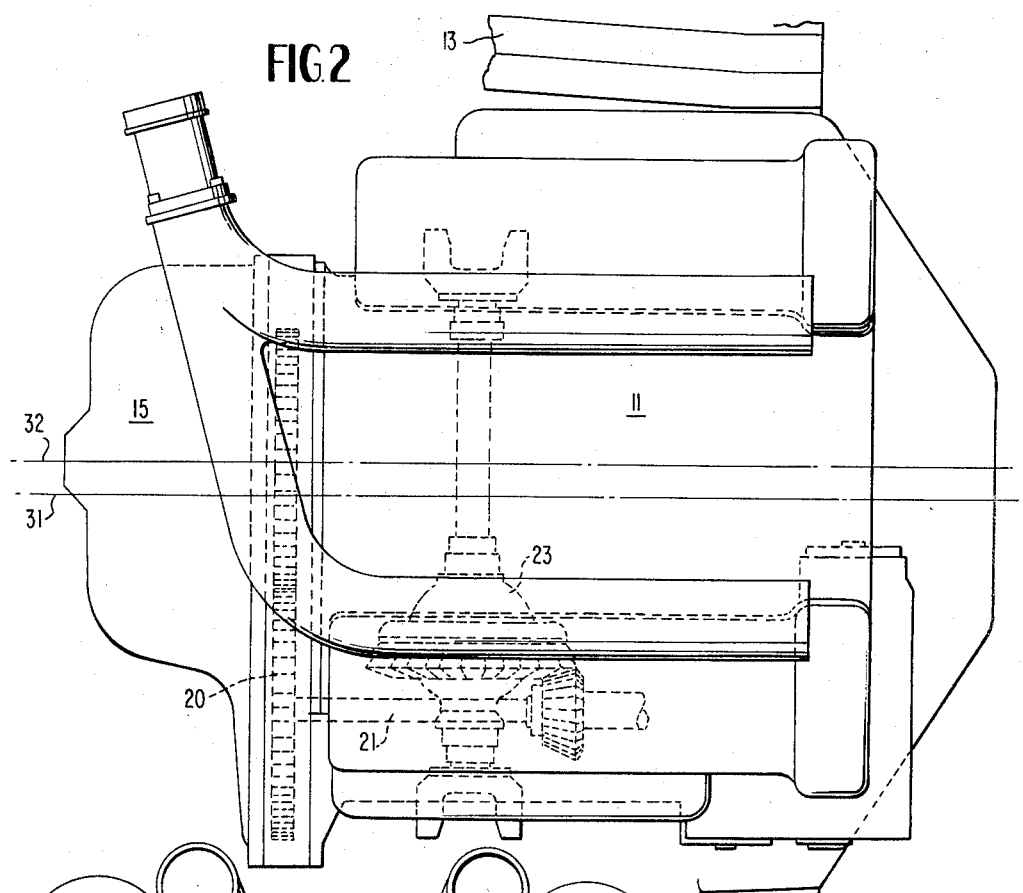
FIGURE 2 is a top plan view on the front-wheel drive unit of FIGURE 1.
Figure 3:
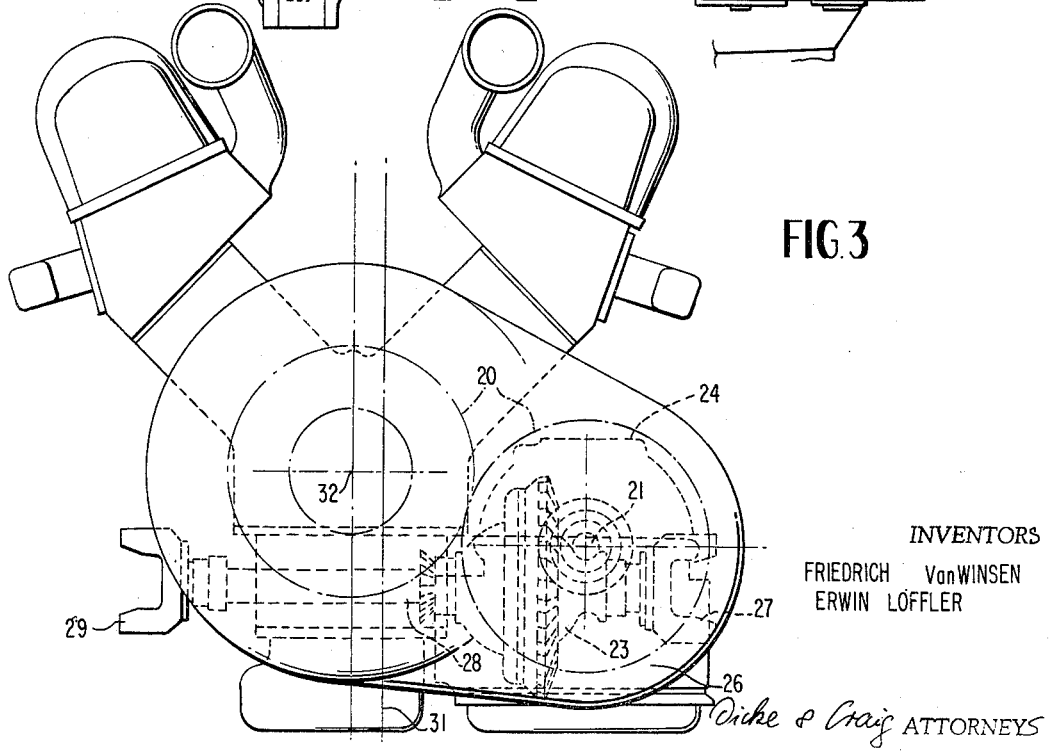
FIGURE 3 is a front elevational view of the front-wheel drive unit of the present invention.

This gear wheel-countershaft transmission 20, which may be of any known construction, leads to the transmission input shaft 21 which—as seen in particular in FIGURES 2 and 3—extends alongside the engine parallel to the crankshaft 17. The transmission input shaft 21 extends through the pinion 22 (FIGURE 1) for the differential gear 23 which is disposed between the engine and the input shaft 21. The differential gear 23 is disposed within the forward area of the engine block 11. To the rear of the differential gear 23 is disposed the transmission 24 which in the instant case is constructed as automatic transmission and whose output shaft 25 is constructed as hollow shaft concentrically surrounding the transmission input shaft 21. Of course, any other change-speed transmission of known construction may also be used.

One output or driven shaft 26 extends from the differential gear 23 (FIGURE 3) below the transmission input shaft 21 to a conventional joint 27 (not illustrated in detail) with which is connected in a conventional manner a corresponding driving half-axle. The other output or driven shaft 28 of the differential gear 23 extends through the engine block 11 below the crankshaft 17 and leads to another conventional joint 29, also not illustrated in detail, with which is connected the other driving half-axle. In order to attain as low as possible a center point of gravity for the entire unit, the arrangement is so made that the output shaft 28 extends below a main bearing 30 of the crankshaft 17.

The engine block 11 is offset or displaced with respect to the vehicle longitudinal center plane 31 (FIGURE 3) in such a manner that its crankshaft axis 32 is located opposite the transmission 24. By this measure of the displacement, it is possible to achieve that the driving half-axles for the front axle are as similar as possible and also have an angle of inclination which is as similar as possible. With the proposed construction of the drive unit, the further advantage is obtained that a favorable axle load distribution can be achieved. This is so as the heavy engine block 11 slips, in effect, rearwardly beyond the axle by the connection of the torque converter at the forward engine end so that its weight is favorably distributed, in that connection, an equally important role is played by the fact that with a forwardly disposed torque converter the transmission is then again located to the rear of the differential gear.

While we have shown and described only one embodiment in accordance with the present invention, it is understood that the same is not limied thereto but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. A drive unit for front-wheel drive vehicles having a front axle adapted to be driven from an engine extending substantially in the longitudinal direction of the vehicle in which the engine, a transmission and a differential gear arrangement are combined into a block and are arranged at the front axle, wherein the improvement essentially comprises: a crankshaft in the engine and being located in the vehicle longitudinal direction substantially above the front axle; a hydrodynamic coupling means; the transmission being a change-speed transmission and being located adjacent the rear of the engine and including a transmission input shaft adjacent to the crankshaft and a transmission output shaft concentric with the input shaft; the coupling means including a driving member and a driven member, two shafts, one of said shafts connecting the driving member with the crankshaft and the other of said shafts being connected to the driven member; connecting means located between the engine and the coupling means and directly drivingly connecting the other shaft of the coupling means with the transmission input shaft; the differential gear arrangement having a housing and a crown gear located between the crankshaft of the engine and the transmission input shaft; the transmission input shaft extending rearwardly from the connecting means past the housing of the differential gear arrangement; the transmission output shaft extending forward to the differential gear arrangement; and the transmission output shaft being drivingly connected to the crown gear of the differential gear arrangement.

2. A drive unit according to claim 1, wherein the two shafts of the coupling means are coaxial with respect to each other.

3. A drive unit according to claim 1, wherein the crankshaft has at least one main bearing and the differential gear arrangement includes output shafts, one of the output shafts extending below the crankshaft through the engine housing and being located transversely below a main bearing of the crankshaft.

4. A drive unit according to claim 3, wherein the two shafts of the coupling means are coaxial with respect to each other.

5. A drive unit according to claim 4, wherein the engine crankshaft is displaced out of the vehicle longitudinal center plane toward the side opposite the transmission and differential gear.

6. A drive unit according to claim 1, wherein said connecting means includes a gear-wheel countershaft transmission.

7. A drive unit according to claim 1, wherein said connecting means includes chain drive means.

References Cited

UNITED STATES PATENTS

| | | | |
|---|---|---|---|
| 2,521,117 | 9/1950 | Du Bois et al. | 74—730 X |
| 2,800,037 | 7/1957 | Czuba et al. | 74—730 |
| 3,029,662 | 4/1962 | Hause | 74—695 |
| 3,052,313 | 9/1962 | Hooven | 180—55 |
| 3,122,944 | 3/1964 | Boehner et al. | 74—700 |
| 3,150,543 | 9/1964 | Dangauthier | 74—700 |
| 3,401,763 | 9/1968 | Rolt | 74—730 X |

FOREIGN PATENTS 1,129,960  9/1956  France.

DONLEY J. STOCKING, Primary Examiner

T. C. PERRY, Assistant Examiner

U.S. Cl. X.R.

74—694, 700; 180—42